Figure 1:
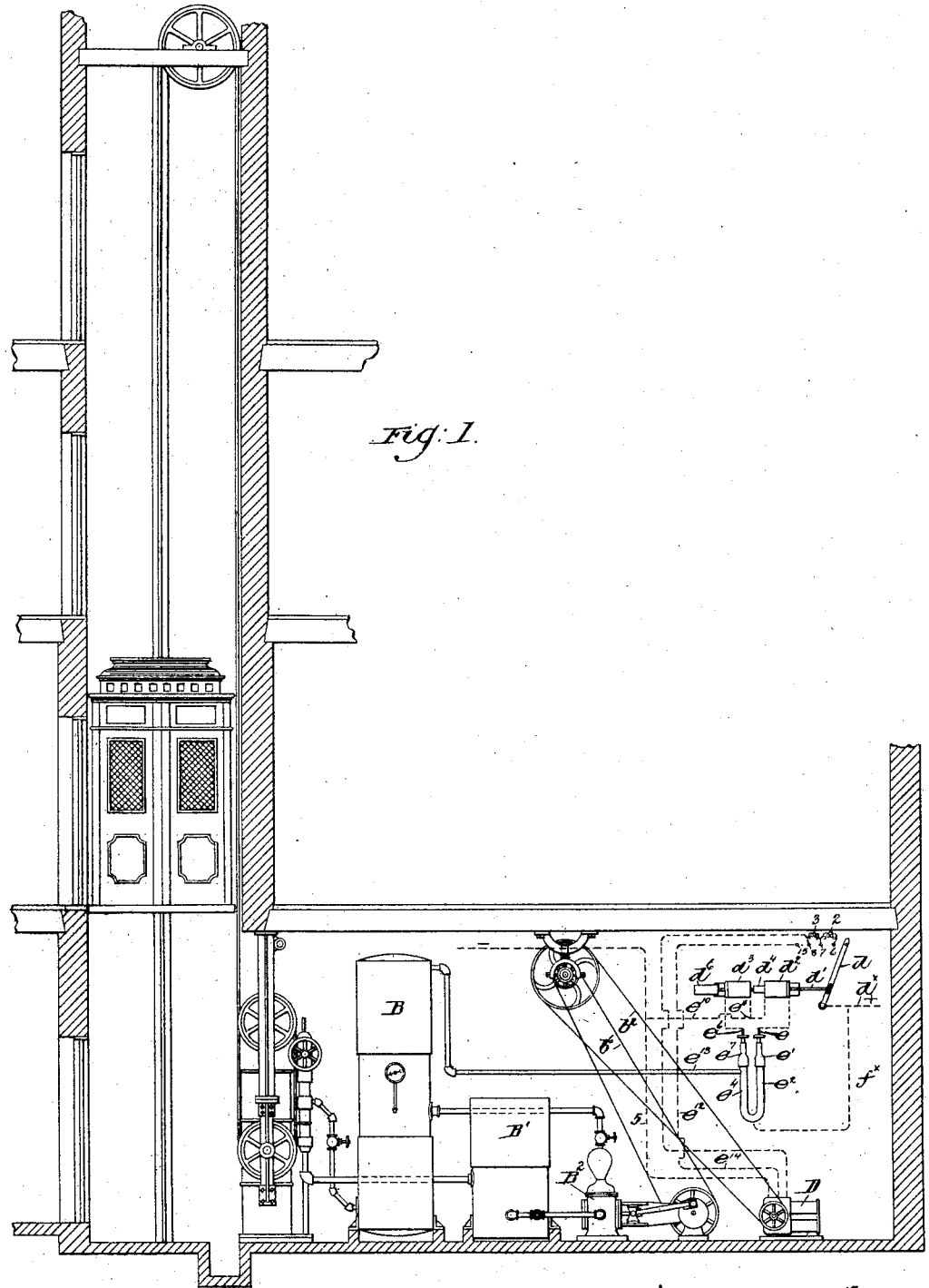

(No Model.) 2 Sheets—Sheet 1.

L. DAFT.
ELECTRIC REGULATOR FOR HYDRAULIC ELEVATOR SYSTEMS.

No. 372,361. Patented Nov. 1, 1887.

Witnesses. Inventor.
Fred L. Emery. Leo Daft.
John F. C. Prindle. by Crosby & Gregory Attys (No Model.) 2 Sheets—Sheet 2.
L. DAFT.
ELECTRIC REGULATOR FOR HYDRAULIC ELEVATOR SYSTEMS.
No. 372,361. Patented Nov. 1, 1887.
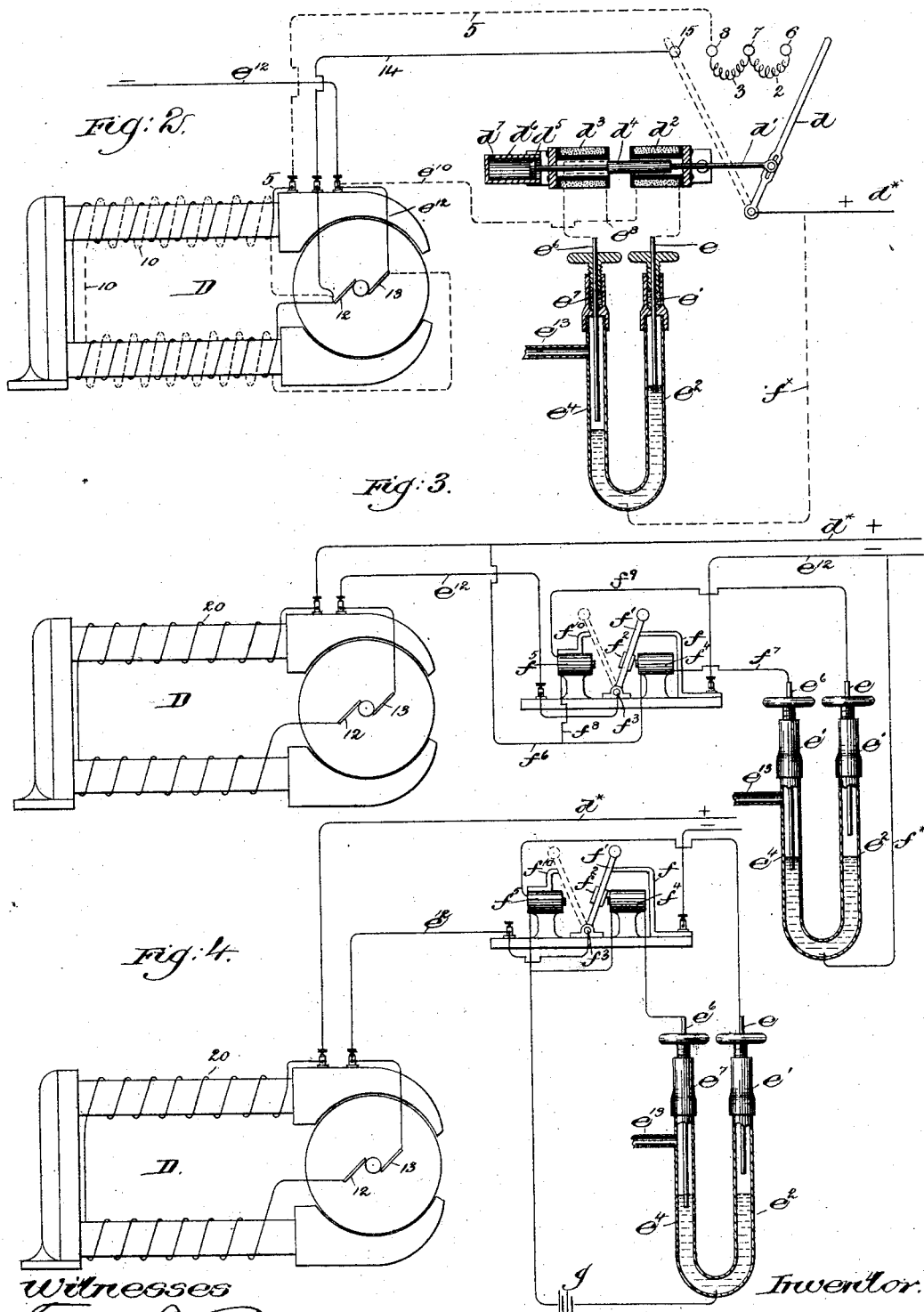

UNITED STATES PATENT OFFICE.

LEO DAFT, OF PLAINFIELD, NEW JERSEY.

ELECTRIC REGULATOR FOR HYDRAULIC-ELEVATOR SYSTEMS.

SPECIFICATION forming part of Letters Patent No. 372,361, dated November 1, 1887.

Application filed February 15, 1887. Serial No. 227,663. (No model.)

*To all whom it may concern:*

Be it known that I, LEO DAFT, a subject of the Queen of Great Britain, residing at Plainfield, county of Union, and State of New Jersey, have invented an Improvement in Electric Regulators for Hydraulic-Elevator Systems, of which the following description, in connection with the accompanying drawings, is a specification, like letters on the drawings representing like parts.

Prior to my invention elevators have been operated by a fluid contained under pressure in a tank, and a pump has been employed to force the fluid into the pressure-tank, as in the Hinckle system, the said pump being driven by an electromotor set in motion by electricity generated at a distant or power station. The electromotor has been operated at intervals, according to the pressure in the pressure-tank, by a mechanical regulator connected to and operating a switch controlling the current-supply circuit of the electromotor.

This invention has for its object to provide means operated by changes of pressure in the pressure-tank, whereby the switch controlling the current-supply circuit may be electrically operated to start or stop the motor, as will be described.

My invention therefore consists, essentially, in a hydraulic-elevator system, of a pump, an electromotor to actuate it, and a switch to control the circuit of the electromotor, combined with an electric regulator controlling the action of the said switch and operated by changes in pressure of the fluid used to actuate the elevator, substantially as will be described.

Other features of my invention will be pointed out in the claims at the end of this specification.

Figure 1 shows in section and elevation a sufficient portion of a building provided with an elevator operated by the Hinckle system and an electromotor controlled by a switch operated by an electric regulator to enable my invention to be understood. Fig. 2 shows in diagram one form of motor and one form of electric regulator. Fig. 3 shows in diagram another form of motor and switch operated by the electric regulator; and Fig. 4 shows a modification, to be referred to.

The elevator-car A, suspended in a hoistway formed between the walls $a$ of a building or other structure, is operated by fluid contained under pressure in the tank B, replenished by fluid from the receiving or storage tank B' by a pump, B$^2$, driven by an electromotor, D, operatively connected to the pump by belts $b^2$ $b^6$, substantially as shown in Fig. 1.

The motor D is actuated by electricity derived from a dynamo or other suitable source of supply, not herein shown, and which in practice may be at a distant point or station, the circuit in which the motor is placed being automatically controlled by an electric regulator, as will be described, by the pressure in the tank or reservoir B.

The motor D preferred by me is the compound-wound Daft motor, (shown in Fig. 2;) but it may be any other well-known form of motor, the said motor being in operative connection with the line or current supply circuit by a switch (shown as a lever, $d$) having connected to it the positive line-wire $d^\times$, and being pivotally connected to a rod, $d'$, extended through two solenoids, $d^2$ $d^3$, and provided at or near its center with an iron core, $d^4$, the said rod having secured to its lower end, as herein shown, a piston, $d^5$, reciprocating in a cylinder, $d^6$, (shown in the present instance as an air-cylinder having an air inlet and outlet, $d^7$.) The circuits of the solenoids $d^2$ $d^3$ are controlled by my improved electric regulator, herein shown as a U-tube containing mercury adapted to be brought in contact with the terminals of the said circuits, as will be described.

The solenoid $d^2$ has one end of its wire connected to a platinum or other connecting-rod, $e$, forming one terminal of the circuit of the solenoid $d^2$, the said rod being inserted, as shown, through a stuffing-box, $e'$, into one leg, $e^2$, of the U-tube referred to, the other leg, $e^4$, of the said tube also having extended into it a connecting-rod, $e^5$, constituting a terminal of the circuit of the solenoid $d^3$, the said rod being extended through the stuffing-box $e^7$ and having connected to it one end of the wire of the solenoid $d^3$, the opposite ends of the wires of the solenoids $d^2$ $d^3$ being joined together, as at $e^8$, and the joined wires connected by wire $e^{10}$ to the negative line-wire $e^{12}$. One leg, as $e^4$, of the U-tube is connected by a pipe, $e^{13}$, to the pressure-tank B, as shown in Fig. 1.

When a compound-wound electromotor is employed, as shown in Fig. 2, and started under full load, it is necessary to prevent an excessive amount of current from passing through the armature before the latter has attained a considerable velocity and so developed suitable resistance, for if the full current should pass through the said armature before it had attained sufficient velocity to develop the proper working resistance injurious sparking at the brushes would result.

To reduce the strength of the current so that a small or weak current may flow through the armature to start the motor, a series of resistances, 2 3, connected to studs 6 7 8, are herein shown interposed in the circuit of the auxiliary primary coil 5 of the motor, the circuit of the motor being completed through the said auxiliary primary coil when the lever $d$ is brought in contact with the stud 6.

The lever $d$ is brought in contact with the stud 6 when the pressure in the tank B has fallen below a predetermined point, which, for instance, may be seventy pounds.

Referring to Fig. 2, it will be seen that the secondary coil 10 (shown by dotted lines) is in a shunt-circuit around the brushes 12 13, the brush 12 being connected by wires 14 with the button 15 and the brush 13 with the negative line-wire $e^{12}$.

In the operation of my improved system, let it be supposed that the car has been stopped at the first floor, as shown in Fig. 1, and that the pressure in the tank is normal. In this case the fluid, which in the present instance is air under pressure in the tank B, acts upon the mercury in the leg $e^1$ of the U-tube and forces the mercury up in the leg $e^2$ and in contact with the platinum rod or wire $e$, thus closing the circuit of the solenoid $d^2$, a considerable portion of the main current passing from the main line $d^x$ through the line $f^x$, (having one end connected to the said main line and having its other end preferably sealed in the bottom of the U-tube and in contact with the mercury therein,) thence through the said mercury, the rod $e$, and solenoid $d^2$, and thence to the line by wire $e^{10}$. As the current flows through the solenoid $d^2$ the core $d^1$ is attracted within it, thus moving the lever over the studs 8 7 6, and beyond the latter into the position shown in Fig. 2 by full lines, it being out of contact with the last of the said studs, thus breaking the circuit of the motor, and consequently stopping it and the pump. The pipe $e^{13}$ may be connected to the pressure-tank below the water-line and water admitted into the leg $e^1$ of the U-tube, the said water acting upon the mercury to force it up in the leg $e^2$ into contact with the rod $e$. In this latter case the circuit of the solenoid $d^3$ is also completed through the water in the leg $e^1$; but the resistance of this circuit is so much greater than the circuit of the solenoid $d^2$ that the greater part of the current flows through the solenoid $d^2$, and consequently the attractive force of the said solenoid $d^2$ for the core $d^1$ overcomes that of the solenoid $d^3$, thereby moving the lever, as described, into the position shown in Fig. 2. This mode of operating with the pipe $e^{13}$ connected to the pressure-tank below the water-line is objectionable, on account of the rapid decomposition of the water which would take place in the leg $e^1$ on the passage of the current through the said water.

When the pressure in the tank B falls below the normal, the pressure upon the mercury in the legs $e^1$ is withdrawn, thus permitting the said mercury to seek its own level in the U-tube, and the rod $e^6$ being longer than the rod $e$, the mercury rising in the leg $e^1$ closes the circuit of the solenoid $d^3$, while the mercury in the leg $e^2$ falls away from the rod $e$, thereby breaking the circuit of the solenoid $d^2$. The solenoid $d^3$ now attracts the core $d^1$ and moves the lever $d$ over the studs connected to the resistances. When the lever $d$ comes in contact with the stud 6, the circuit of the motor is completed through the resistances and the auxiliary primary coil 5, thus rotating the armature and actuating the pump to force more fluid into the pressure-tank.

The movement of the core $d^1$ within the solenoid $d^3$ is retarded by the piston in the air-cylinder, thereby obtaining a gradual movement of the switch-lever over the studs, the resistances connected to said studs being gradually eliminated as the velocity of the armature increases, the said armature having attained its maximum velocity when the switch-lever comes in contact with the stud 15.

With the switch-lever in contact with the stud 15 the auxiliary primary coil is cut out of circuit and the motor becomes a simple shunt machine, a portion of the current passing through the secondary field-coil 10, of considerable resistance, the counter electro-motive force generated in the armature when the latter has attained its maximum velocity being sufficient to weaken the main current, so as to prevent injurious sparking at the brushes.

I have thus far described my improved electric regulator as applied to a compound-wound motor; but the said electric regulator is equally applicable to a series-wound motor, and when the latter type of motor is used the resistances 2 3 may be dispensed with and a simple switch employed.

Referring to Fig. 3, I have shown a series-wound motor, the positive line-wire $d^x$ being connected through the field 20, of comparatively high resistance, with one brush, 12, and the negative wire $e^{12}$ with one terminal, $f$, of a switch, the co-operating terminal of which is a lever, $f'$, provided, as herein shown, with a double armature, $f^2$, pivoted, as at $f^3$, and oscillating between magnets $f^4 f^5$. The magnet $f^4$ is connected with the positive wire $d^x$ by the wire $f^6$ and with the rod $e^6$ of the U-tube by wire $f^7$, the magnet $f^5$ being connected by the wire $f^8$ to the wire $f^6$ and by the wire $f^9$ with the rod $e$ of the said U-tube, the latter containing mercury in contact with the wire $f^x$, connected to the negative wire. The magnet $f^5$, as shown, supports an arm, $f^{10}$, which limits the movement of the lever $f'$ toward the said magnet.

With the arrangement shown in Fig. 3, when the pressure in the tank B falls so as to permit the mercury in the leg $e^4$ of the U-tube to close the circuit of the magnet $f^4$, the latter attracts its armature $f^2$ and brings the lever $f'$ in contact with its co-operating terminal $f$, thereby closing the circuit of the motor and starting the same to actuate the pump. When the pressure in the tank has reached the normal or predetermined point, the mercury is forced up in the leg $e^2$, closing the circuit of the magnet $f^5$, which attracts the armature $f^2$, thereby breaking the circuit of the motor, the lever $f'$ at such time occupying the dotted-line position, Fig. 3. When the mercury falls in the leg $e^4$ away from the rod $e^6$, thus breaking the circuit of the magnet $f^4$, the lever $f'$ is maintained in contact with the terminal $f$, as herein shown, by gravity, thus keeping the motor-circuit intact.

In Figs. 2 and 3 I have shown the solenoids $d^2 d^3$ and magnets $f^4 f^5$, respectively, in a shunt-circuit; but, if desired, the same might be placed in a local circuit operated by a battery, $g$, as shown in Fig. 4. When placed in a shunt-circuit, the solenoids and magnets will be of such high resistance that practically there is no waste of current, and the amount of current is so small that the contacts between the mercury and the rods $e\ e^6$ are made with an inappreciable spark. The rods $e\ e^6$ may be adjusted in the said U-tube to close the circuit of the motor when the pressure in the tank has reached any desired or predetermined point.

I have herein shown the conducting-rods $e\ e^6$ as inserted through stuffing-boxes to permit of their adjustment; but, if desired, the said rods may be sealed in the legs of the U-tube.

I do not desire to limit my invention to the particular form of resistance or switch herein shown, as other forms may be used.

I claim—

1. In a hydraulic-elevator system, a pump, an electromotor to actuate it, and a switch to control the circuit of the electromotor, combined with an electric regulator controlling the action of the said switch and operated by changes in pressure of the fluid used to actuate the elevator, substantially as described.

2. In a system for actuating hydraulic elevators, the following instrumentalities, viz: a tank to contain fluid under pressure, a pump to force the fluid into the said tank, and an electromotor to operate the said pump at intervals, combined with a switch to control the circuit of the electromotor, and with an electric regulator controlling the action of said switch and operated by changes in pressure of the fluid used to actuate the elevator, substantially as described.

3. In a system for actuating hydraulic elevators, a tank to contain fluid under pressure, a pump to force the fluid into the said tank, an electromotor to operate the said pump at intervals, a resistance in circuit with the motor, and a lever co-operating therewith, combined with an electric regulator operated by changes in pressure of the fluid in the pressure-tank and controlling the action of said lever to affect the circuit of the electromotor, substantially as described.

4. In a system for actuating hydraulic elevators, a tank to contain a fluid under pressure, a pump and an electromotor, a resistance, and a lever co-operating therewith, combined with an electric regulator comprising a U-tube containing mercury, and circuit-terminals of magnets to operate the said lever, the mercury in the said U-tube being operated upon by the pressure in the tank to close the circuit-terminal of one magnet, and thereby close the circuit of the electromotor, substantially as described.

In testimony whereof I have signed my name to this specification in the presence of two subscribing witnesses.

LEO DAFT.

Witnesses:
G. W. GREGORY,
J. H. CHURCHILL.